Oct. 13, 1936.   A. CAMBRON ET AL   2,057,007
VAPOR PHASE CRACKING OF HYDROCARBONS
Filed March 13, 1935
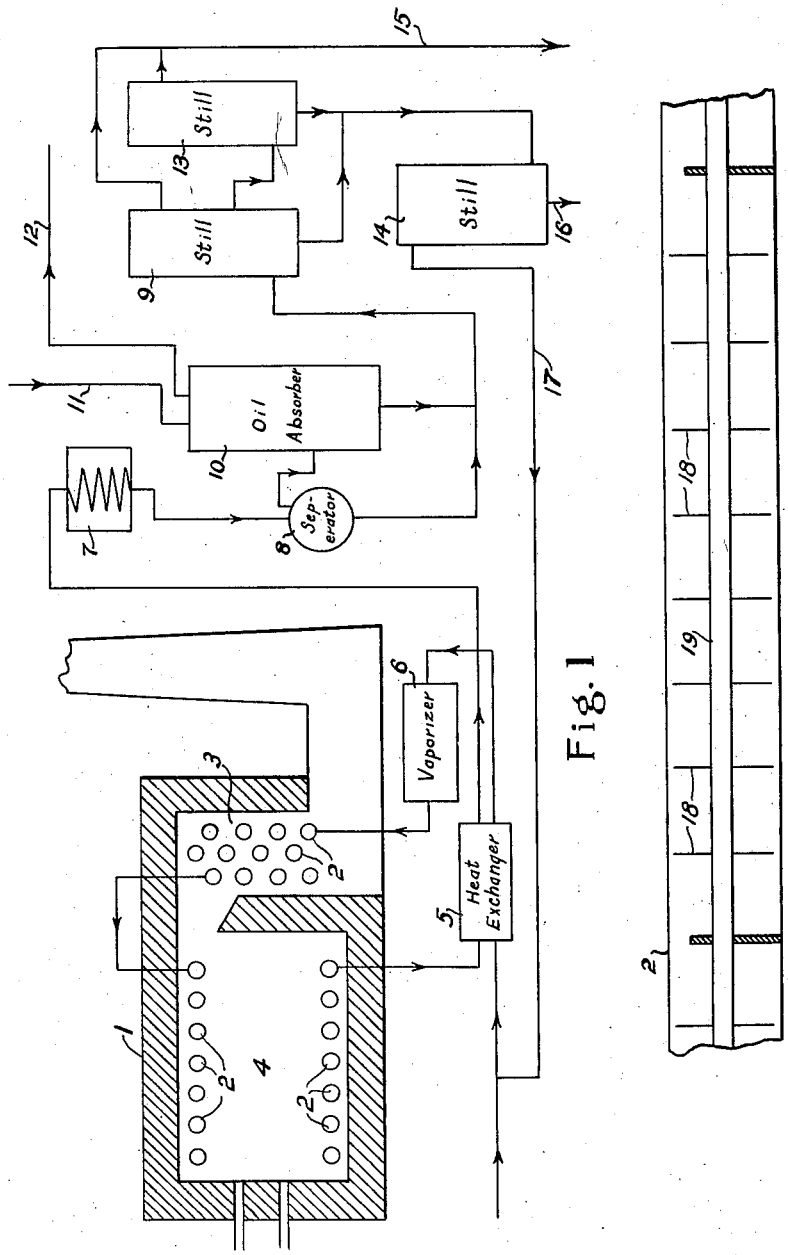
INVENTORS:
ADRIEN CAMBRON and COLIN HAHNEMANN BAYLEY
BY Alex. E. MacRae
ATTORNEY.

Patented Oct. 13, 1936

2,057,007

UNITED STATES PATENT OFFICE 2,057,007

VAPOR PHASE CRACKING OF HYDROCARBONS

Adrien Cambron and Colin Hahnemann Bayley, Ottawa, Ontario, Canada

Application March 13, 1935, Serial No. 10,876

4 Claims. (Cl. 196—61)

This invention relates to the vapor phase cracking of heavy hydrocarbons, such as gas oils, and particularly to an improved process therefor, whereby less complex products are obtained and higher space velocities are employed.

The object of the invention is to provide a process for the vapor phase cracking of heavy petroleum fractions, such as gas oils, with high capacity, higher yields of gasoline at lower temperatures and a higher aromatic content in the end product. A further object is to provide a process of vapor phase cracking which avoids carbon formation and objectionable side-reactions which reduce the yield of the desired products, lower the efficiency of the process and limit the temperature at which the process can be economically operated.

In vapor phase cracking it is apparent that efficiency of operation is dependent in a large measure upon the character of the transfer of heat from the walls of the reaction tube to the vapors at operating temperatures. The low rate of heat transfer from heating surfaces to vapors in comparison with the rate from heating surfaces to liquids has retarded the development of vapor phase processes. Lack of uniformity of heat transfer to all portions of the vapor stream results in uneven cracking of the vapors, lowers permissible space velocity and produces undesired products, including free carbon which greatly reduces the efficiency of the tubes and shortens their life.

In obtaining high cracking capacity space velocity is a primary consideration. Space velocity, as used herein, means units of volume of vapor put through per unit of volume of reaction chamber per unit of time. Reaction space is that volume of the apparatus used for the thermal treatment of vapors which is at or close to the reaction temperature. The present invention contemplates a process wherein a most effective heat transfer to the vapors is coordinated with a high space velocity to produce an improved yield of gasoline having a substantial content of aromatics. The growing demand for high antiknock fuels, resulting from the use of increasing compression ratios in automobile engines, makes such products increasingly important.

The invention will be described with reference to the accompanying drawing which illustrates diagrammatically apparatus for operating the process and in which Figure 1 shows a cracking furnace in section and diagrammatically the oil and vapor flow through apparatus commonly used.

Figure 2 diagrammatically illustrates the heating and cracking tubes.

In the drawing 1 represents a cracking furnace in which heating and cracking tubes 2 are arranged preferably in a convection section 3 in which the gases or vapors are preheated and a radiant section 4 in which cracking takes place. The arrows indicate the direction of flow of oil and vapors. Charging stock, such as gas oil, preferably together with recycle stock, is passed through the heat exchanger 5, through which hot vapors from the furnace are circulated, and the hot oil is vaporized in the vaporizer 6 from which vapors pass to the preheating section 3 of the furnace and continue through the cracking section 4. In passing through the heat exchanger 5 the vapors are rapidly cooled below reaction temperature and the liquids condensed in the condenser 7 are collected in the separator and fog precipitator 8 from which they are pumped to the fractionating still 9. The uncondensed gases or vapors pass through the oil absorber 10 for recovery of low boiling liquids, the stripped gases escaping through 12. The wash oil fed to the absorber by the line 11 is preferably the same as or part of the charging stock. The wash oil and dissolved liquids flow with liquids from the separator 8 to the still 9. Additional stills 13 and 14 are also employed to yield three fractions, gasoline at 15, tar at 16 and recycle stock at 17.

The heating and cracking tubes 2 are provided with a multiplicity of baffles 18 arranged in spaced relation on the axis 19 of the tube and of somewhat less diameter than the tube, thus providing a narrow annular space between the edge of each baffle and the wall of the tube. The detail construction and operation of these tubes are disclosed in copending application Serial Number 658,098 filed February 23, 1933, and divisional application Serial Number 709,202, filed January 31, 1934.

In operation the charging stock is passed through the baffled cracking tube at a space velocity exceeding 3 litres per litre of reaction space per hour, which gives a greatly increased production capacity over heretofore known processes and the aromatic content of the cracked oil exceeds 25%. The temperature within the tubes preferably does not exceed 800° C.

As illustrative of the results obtained the following examples may be given when cracking a gas oil having a specific gravity of 0.855 at 25° C. and an aniline point of 62.2.

| Tube temperature | 205° end-point gasoline % yield based on oil throughput | Aromatic content % |
|---|---|---|
| °C. | | |
| 600 | 16.0 | 0 |
| 650 | 22.4 | 10 |
| 700 | 24.4 | 25 |
| 750 | 24.1 | 42 |
| 800 | 22.3 | 60 |

In each case the space velocity exceeded 3 and was as high as 3.77 litres per litre of reaction space per hour. It will be observed that the yields of gasoline at the lower temperatures from 600 to 700° C. are much higher than the yields which can be obtained at such high rates of throughput and at similar temperatures by previous processes, and that the gasoline produced at the higher temperatures contains an unusually high percent of aromatics. The space velocity and hence the oil throughput is substantially three times as high as that normally employed. Thus the production capacity of the process is unusually high. At space velocities exceeding 3 litres (of liquid) per litre of reaction space per hour it is found that the turbulence created in the reaction tubes, having the particular type of baffle arrangement shown, is such that the transfer of heat from the tube walls to the vapors is so uniform and rapid that carbon formation is practically entirely avoided and other undesired reactions do not occur. The result is that, at temperatures between 600 and 700° C. an exceptionally high yield of 205° end point gasoline is obtained, and as the temperature increases to 800° C. an increasingly large amount of aromatics appears in the gasoline.

At the lower temperatures of 600 and 650° C. the liquids produced consist predominantly of the primary decomposition products of the heavy paraffins, while a substantial amount of the olefines is polymerized to form aromatics at even 700° with increasing amounts at 750 and 800° C. In known processes the formation of benzene and toluene becomes appreciable only at temperatures around 800° C.

It will be apparent that the process may be operated under pressure and that a fraction of the off-gas may be recirculated through the cracking furnace with the charging stock and recycle stock.

The production of aromatics by vapor-phase cracking has heretofore been considered unpracticable on account of the complexity of the product, the separation from the aromatic fraction of the considerable amounts of unsaturates which are produced at the same time being extremely difficult and wasteful. The mono- and di-olefine content of the benzene-toluene fraction of the cracked oil produced in the present process, is less than half of that of the corresponding fraction of the product as normally produced. In view of the increased capacity, the greater ease of refining and the higher yields of aromatics produced by the present process, the production of aromatics by the vapor phase cracking of high boiling petroleum fractions can be definitely regarded as a potential source of aromatics.

We claim:

1. A process of producing gasoline having an aromatic content in excess of 25% which comprises vaporizing a high boiling petroleum fraction, passing the vapors at a space velocity exceeding the equivalent in vapor of three litres of liquid per litre of reaction space per hour through a reaction tube in turbulent flow which repeatedly varies the velocity of flow of the vapors at successive annular spaces adjacent the wall of the tube and maintaining the tube at a temperature not exceeding 800° C.

2. In the vapor phase cracking of heavy petroleum fractions, the method of increasing production capacity which comprises passing petroleum vapors through a baffled reaction tube at a space velocity exceeding the equivalent in vapor of three litres of liquid per litre of reaction space per hour and repeatedly varying the linear velocity of the vapors at successive annular spaces adjacent the wall of the tube while maintaining the tube at a temperature not exceeding 800° C.

3. In the vapor phase cracking of heavy petroleum fractions, the method which comprises passing petroleum vapors through a baffled reaction tube at a space velocity exceeding the equivalent in vapor of three litres of liquid per litre of reaction space per hour, maintaining the reaction tube at a temperature not exceeding 800° C. and causing a relatively high linear velocity of the vapors at a multiplicity of successive annular spaces adjacent the heated wall of the tube.

4. In the vapor phase cracking of heavy petroleum fractions, the method which comprises passing through a baffled externally heated reaction tube, maintained at a temperature between 600 and 700° C., petroleum vapors at a space velocity exceeding the equivalent in vapor of three litres of liquid per litre of reaction space per hour and repeatedly varying the linear velocity of the vapors at successive annular spaces adjacent the heated wall of the tube.

ADRIEN CAMBRON.
COLIN HAHNEMANN BAYLEY.